(12) United States Patent
Carr et al.

(10) Patent No.: US 7,673,621 B2
(45) Date of Patent: Mar. 9, 2010

(54) LEARN CORRECTION FEATURE FOR VIRTUAL FLEX FUEL SENSOR

(75) Inventors: Mark D. Carr, Fenton, MI (US); Louis A. Avallone, Milford, MI (US); Ian J. MacEwen, White Lake, MI (US); Wajdi B. Hamama, Whitmore Lake, MI (US); Julian R. Verdejo, Farmington, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 349 days.

(21) Appl. No.: 11/853,470

(22) Filed: Sep. 11, 2007

(65) Prior Publication Data

US 2009/0064976 A1  Mar. 12, 2009

(51) Int. Cl.
*F02B 13/00* (2006.01)
*F02B 13/10* (2006.01)

(52) U.S. Cl. .................... 123/575; 123/674

(58) Field of Classification Search ............. 123/575, 123/674, 299, 304, 1 A; 701/109, 114, 115, 701/103; 73/114.52, 114.53, 114.54
See application file for complete search history.

(56) References Cited

U.S. PATENT DOCUMENTS

| | | | | |
|---|---|---|---|---|
| 4,957,087 A * | 9/1990 | Ota | ............................. | 123/479 |
| 5,881,703 A * | 3/1999 | Nankee et al. | .............. | 123/686 |
| 5,957,094 A * | 9/1999 | Krausman et al. | ........... | 123/1 A |
| 6,041,278 A * | 3/2000 | Kennie et al. | ................ | 701/103 |
| 6,298,838 B1 * | 10/2001 | Huff et al. | .................... | 123/674 |
| 6,714,856 B2 * | 3/2004 | Huff et al. | .................... | 701/114 |
| 6,975,933 B2 * | 12/2005 | Abe et al. | ................... | 701/109 |

* cited by examiner

*Primary Examiner*—Mahmoud Gimie

(57) ABSTRACT

A system for estimating fuel concentration comprises an ethanol estimating module that generates an ethanol estimate based on baseline closed loop corrections (CLC). A fuel system module controls fuel to an engine and generates a fuel system error. The ethanol estimating module selectively adjusts the baseline CLC and the ethanol estimate based on the fuel system error. A method for estimating fuel concentration comprises generating an ethanol estimate based on baseline closed loop corrections (CLC); controlling fuel to an engine and generating a fuel system error; and selectively adjusting said baseline CLC and said ethanol estimate based on said fuel system error.

14 Claims, 3 Drawing Sheets

LEARN CORRECTION FEATURE FOR VIRTUAL FLEX FUEL SENSOR

FIELD

The present disclosure relates generally to vehicle fuel control systems, and more particularly to systems and methods for estimating fuel composition.

BACKGROUND

Closed loop fuel control systems may be used in gasoline-powered vehicles to maintain an operating air-fuel (A/F) ratio at stoichiometry. Stoichiometric values, however, can vary with fuel composition. For example, when fuel is added to a vehicle fuel tank, it mixes with fuel already in the tank. Gasoline or ethanol in varying mixtures can be added to gasoline or ethanol already in the tank.

If the added fuel has a different composition from that of the fuel already in the tank, the engine of the vehicle may need to operate at a different stoichiometric value after the refueling. Currently manufactured vehicles may include a hardware sensor or estimation algorithm that senses and communicates ethanol content in fuel to other systems in the vehicle.

SUMMARY

A system for estimating fuel concentration comprises an ethanol estimating module that generates an ethanol estimate based on baseline closed loop corrections (CLC). A fuel system module controls fuel to an engine and generates a fuel system error. The ethanol estimating module selectively adjusts the baseline CLC and the ethanol estimate based on the fuel system error.

A method for estimating fuel concentration comprises generating an ethanol estimate based on baseline closed loop corrections (CLC); controlling fuel to an engine and generating a fuel system error; and selectively adjusting said baseline CLC and said ethanol estimate based on said fuel system error.

Further areas of applicability of the present disclosure will become apparent from the detailed description provided hereinafter. It should be understood that the detailed description and specific examples, while indicating exemplary embodiments of the disclosure, are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION OF EXEMPLARY EMBODIMENTS

Figure 1:
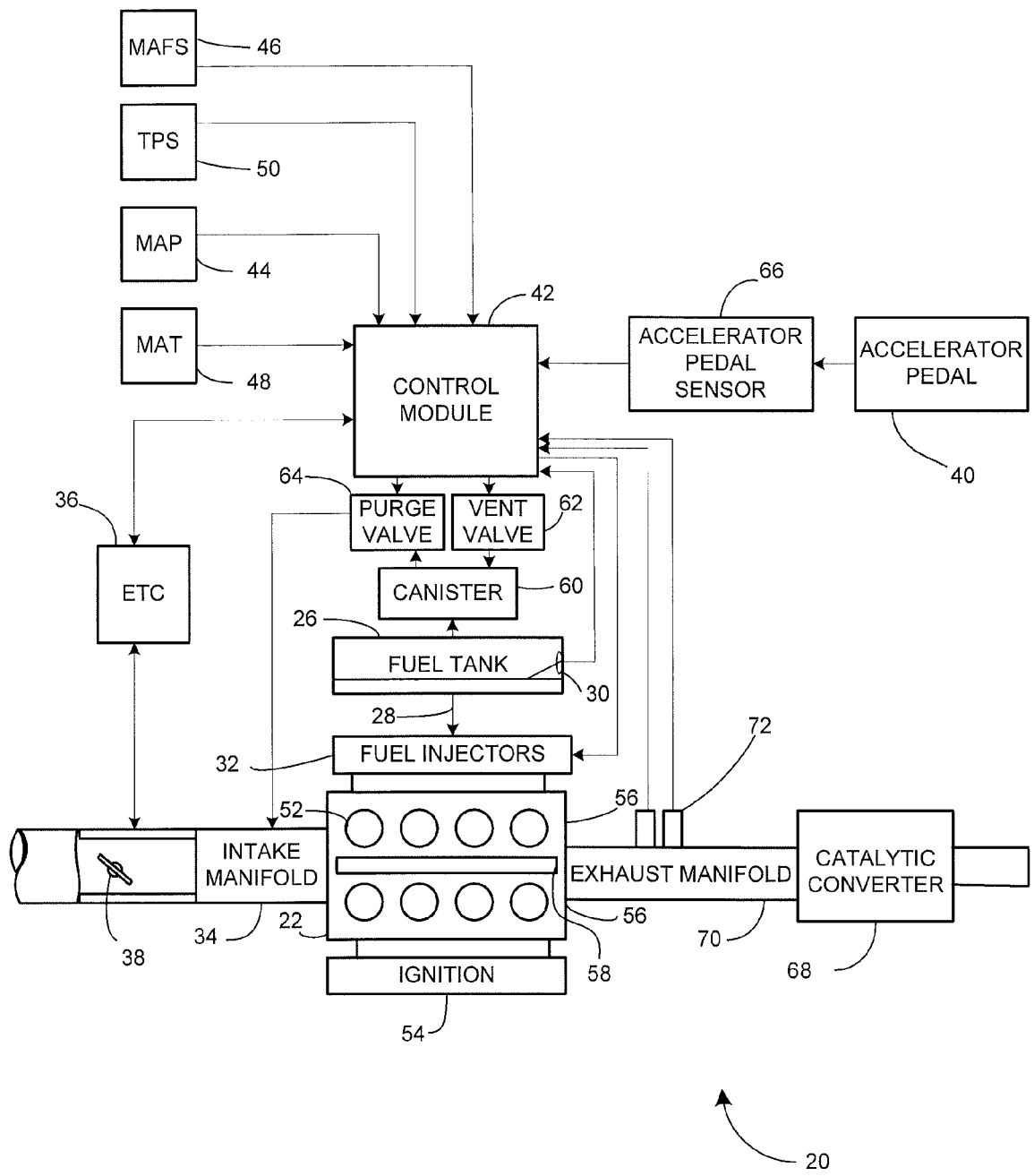
FIG. 1 is a functional block diagram of a vehicle including a fuel composition estimation system according to the present disclosure.

The following description of various embodiments of the present disclosure is merely exemplary in nature and is in no way intended to limit the disclosure, its application, or uses. For purposes of clarity, the same reference numbers will be used in the drawings to identify similar elements. As used herein, the term module and/or device refers to an application specific integrated circuit (ASIC), an electronic circuit, a processor (shared, dedicated, or group) and memory that execute one or more software or firmware programs, a combinational logic circuit, and/or other suitable components that provide the described functionality.

The present disclosure monitors fuel system errors after an ethanol estimate has been completed and allows a calibrated amount of the fuel system error or fuel trim (FT) to be assigned to the ethanol estimate if the observed fuel system error is greater than a calibrated threshold. The error may also be used to adjust the baseline closed loop corrections (CLCs) that are used as the reference point for the ethanol estimation.

The calibrated amount of fuel system error that is used to adjust the ethanol estimate and baseline CLC is less than the known typical fuel system error, which can be attributed to air meter wear, injector wear, fuel pressure regulator wear and/or injector plugging. To remain compliant with on board diagnostic (OBD) fuel trim diagnostic requirements, the learn correction may be selectively enabled after each refuel event to avoid continuously shifting any fuel system error to the ethanol estimate. More frequent adjustments may lead to assigning real fuel trim faults into the ethanol estimate. Additionally, the learn correction may be enabled when the baseline closed loop corrections (CLC) (used as the reference point for the ethanol estimation) had just been learned in a predetermined "good" region (operating cell) where the closed loop system is normally expected to be stable.

Referring now to FIG. 1, a vehicle including a fuel composition estimation system is indicated generally by reference number 20. The vehicle 20 may be fueled with gasoline and/or ethanol in various concentrations. Fuels appropriate for the vehicle 20 include but are not limited to gasoline, E85 (an alcohol fuel mixture that typically contains a mixture of up to 85% denatured fuel ethanol and gasoline or other hydrocarbon by volume), E70, E10 or other fuel concentrations.

Fuel is delivered to an engine 22 from a fuel tank 26 through a fuel line 28 and through a plurality of fuel injectors 32. A fuel sensor 30 senses a level of fuel in the tank 26 and communicates the fuel level to a control module 42. Air is delivered to the engine 22 through an intake manifold 34.

An electronic throttle controller (ETC) 36 adjusts a throttle plate 38 that is located adjacent to an inlet of the intake manifold 34 based upon a position of an accelerator pedal 40 and a throttle control algorithm that is executed by the control module 42. In controlling operation of the vehicle 20, the control module 42 may use a sensor signal 44 indicating pressure in the intake manifold 34. The control module 42 also may use a sensor signal 46 indicating mass air flow entering the intake manifold 34 past the throttle plate 38, a signal 48 indicating air temperature in the intake manifold 34, and a throttle position sensor signal 50 indicating an amount of opening of the throttle plate 38.

The engine 22 includes a plurality of cylinders 52 arranged in one or more cylinder banks 56. The cylinders 52 receive fuel from the fuel injectors 32 where it undergoes combustion in order to drive a crankshaft 58. Vapor from the fuel tank 26 can be collected in a charcoal storage canister 60. The canister 60 may be vented to air through a vent valve 62. The canister 60 may be purged through a purge valve 64. When vapor is purged from the canister 60, it is delivered to the intake manifold 34 and burned in the engine cylinders 52. The control module 42 controls operation of the vent valve 62, purge valve 64, fuel injectors 32 and ignition system 54. The control module 42 also is connected with an accelerator pedal sensor 66 that senses a position of the accelerator pedal 40 and sends a signal representative of the pedal position to the control module 42.

A catalytic converter 68 receives exhaust from the engine 22 through an exhaust manifold 70. Each of a pair of exhaust sensors 72, e.g., oxygen sensors, is associated with a corresponding cylinder bank 56. The oxygen sensors 72 sense exhaust in the manifold 70 and deliver signals to the control module 42 indicative of whether the exhaust is lean or rich. The signal output of the oxygen sensors 72 is used by the control module 42 as feedback in a closed-loop manner to regulate fuel delivery to each cylinder bank 56, e.g., via fuel injectors 32. It should be noted that configurations of the present disclosure are also contemplated for use in relation to vehicles having a single bank of cylinders and/or a single exhaust manifold oxygen sensor.

In some implementations, the sensors 72 are switch-type oxygen sensors as known in the art. The control module 42 may use the sensor 72 feedback to drive an actual air-fuel ratio to a desired value, usually around a stoichiometric value which may vary depending upon the concentrations of ethanol and gasoline. A plurality of predefined engine operating regions are referred to by the control module 42 in controlling fuel delivery to the engine 22. Operating regions may be defined, for example, based on speed and/or load of the engine 22. The control module 42 may perform control functions that vary dependent on which operating region of the vehicle is currently active.

Fuel, air and/or re-circulated exhaust to the engine 22 may be adjusted, i.e., trimmed, to correct for deviations from a desired air-fuel ratio. Trim values used to make such corrections may be stored in control module 42 memory locations corresponding to a plurality of predefined closed loop air-fuel ratio control cells (also referred to as sub-regions) associated with the operating regions of the vehicle 20. Cell values are used to provide closed-loop fuel, air and/or re-circulated exhaust control. For example, long-term multipliers (LTMs) may be used to provide long-term corrections to fuel commands to the engine 22 in response to changing engine conditions. LTMs typically are stored in a memory lookup table in non-volatile memory. The control module 42 adjusts LTMs periodically in accordance with a long-term time period, e.g., using a period that is longer than 1 second such as ten seconds. Such adjustment may be referred to as "long-term learning".

Additionally or alternatively, short-term integrators (STIs) may be used to provide short-term corrections to fuel commands to the engine 22 in response to engine conditions. The control module 42 adjusts STIs periodically in accordance with a short-term time period, e.g., using a period that is less than one second such as every 6.25 milliseconds. Such adjustment may be referred to as "short-term learning". An STI may be stored in volatile memory and may be adjusted based on an active cell LTM and a signal of the oxygen sensor 72.

In accordance with one implementation of the present disclosure, the control module 42 maintains a fuel trim memory structure (such as a lookup table for example) for use in estimating fuel composition. A plurality of closed loop correction ("CLC") cells can be associated with each cylinder bank 56. For example, eight cells may be provided for each bank 56. CLC cells are defined based on mass air flow to the engine 22 and may be used to record a total closed-loop fuel trim of the engine 22 at various operating conditions. The control module 42 stores baseline closed loop correction values for the engine operating regions in the CLC cells. Baseline CLC values may be updated when purge is commanded off as further described below. The baseline CLC values provide a basis for determining new fuel/air estimates.

CLC cell values are stored in non-volatile memory. A CLC value is obtained by multiplying LTM and STI corrections for an active closed-loop fuel control cell. In other configurations, CLC values may be combined in other ways. For example, a CLC value may be obtained in another configuration by adding LTM and STI corrections for an active closed-loop fuel control cell. In the present configuration, the control module 42 uses separate structures for closed loop fuel control and for fuel composition estimation. The structures are separate so that the fuel composition estimation structure may remain current over ignition cycles, even though the closed loop fuel control structure might be reset upon vehicle system power-up. It should be noted generally that configurations also are contemplated in which a vehicle control module may use a single memory structure for both closed loop fuel control and fuel composition estimation. Further details of a control module that estimates fuel composition according to the present teachings may be found in commonly owned U.S. Pat. No. 7,159,623, the disclosure of which is incorporated by reference in its entirety.

Figure 2:
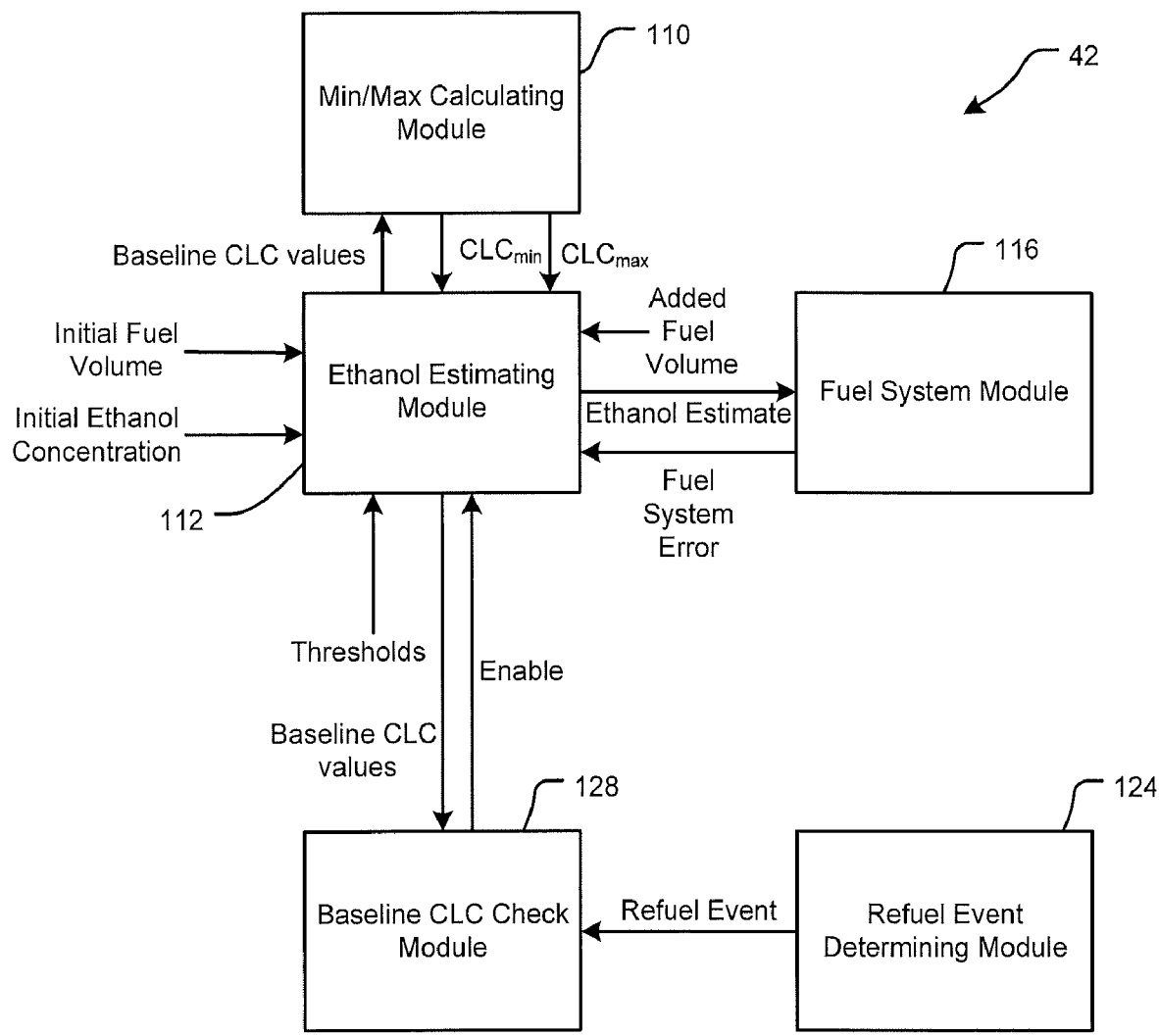
FIG. 2 is a functional block diagram of an exemplary control module according to the present disclosure.

Referring now to FIG. 2, an exemplary control module 42 includes a min/max calculating module 110, an ethanol estimating module 112, a fuel system module 116, a refuel event determining module 124, and a baseline CLC check module 128.

The ethanol estimating module 112 receives an initial fuel volume, an added fuel volume and an initial ethanol concentration value and generates lower and upper limits that are used during ethanol estimation. The ethanol estimating module 112 also maintains baseline CLC values.

The min/max calculating module 110 determines minimum and maximum CLC values ($CLC_{min}$ and $CLC_{max}$, respectively) for all baseline CLC values. These values are then used by the ethanol estimating module 112 to determine if a learn correction should occur.

The ethanol estimating module 112 generates an ethanol estimate. For example only, the ethanol estimate may be based on baseline CLC values as well as other values that may include the initial fuel volume, the added fuel volume and/or the initial ethanol concentration value as well as other available vehicle inputs. For example only, the thresholds that are input to the ethanol estimating module 112 may include max and min allowed correction values ($allow\_corr_{max\_TH}$ and $allow\_corr_{min\_TH}$) that may be calibrated values that are based on one or more of air meter wear, injector wear, fuel pressure regulator wear and injector plugging for a particular vehicle.

The fuel system module 116 controls the amount of fuel delivered to the injectors based on the ethanol estimate as well as other vehicle inputs. The fuel system module 116 also generates a fuel system error, which is output to the ethanol estimating module 112. The fuel system error may be generated using fuel system models and feedback provided by the oxygen sensors 72.

The ethanol estimating module 112 selectively adjusts the baseline CLC, which in turn impacts the ethanol estimate. The refuel event determining module 124 and the baseline CLC check module 128 may be used to determine when the adjustments are made to the baseline CLC. For example only, the refuel event determining module 124 may identify refuel events. For example, the refuel event determining module 124 may monitor fuel levels and signal a refuel event when the level increases by a predetermined amount. Other methods such as monitoring opening and closing of the fuel door may be used.

Figure 3:
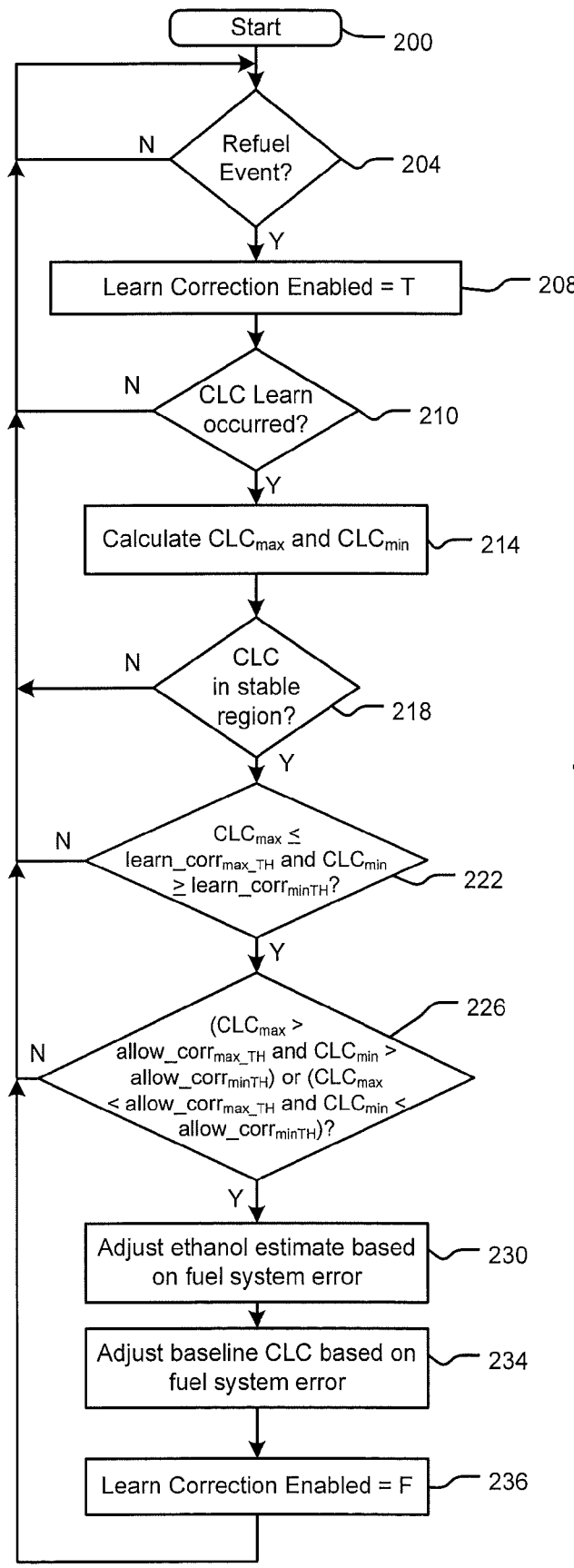
FIG. 3 is a flow diagram of a method for estimating fuel composition according to the present disclosure.

Referring now to FIG. 3, control begins with step 200. In step 204, control determines whether a refuel event occurred.

If step 204 is true, control enables a learn correction in step 208. After a learn correction has been performed as determined in step 210, control calculates $CLC_{max}$ and $CLC_{min}$ in step 214. In step 218, control determines whether the learned CLC is in a stable region. In other words, control determines whether the baseline CLC that had just been learned is in a predetermined region where the closed loop system is normally expected to be stable.

If step 218 is true, control compares $CLC_{max}$ and $CLC_{min}$ values to max and min learned correction thresholds (learn_$corr_{min\_TH}$ and learn_$corr_{max\_TH}$) in step 222. More particularly, if $CLC_{max} \leq$ learn_$corr_{max\_TH}$ and $CLC_{min} \geq$ learn_$corr_{min\_TH}$, then control proceeds with step 226. The min and max learned correction thresholds learn_$corr_{min\_TH}$ and learn_$corr_{max\_TH}$ may be calibrated values.

In step 226, control compares $CLC_{max}$ and $CLC_{min}$ values to max and min allowed correction values (allow_$corr_{max\_TH}$ and allow_$corr_{min\_TH}$). More particularly, if ($CLC_{max}$>allow_$corr_{max\_TH}$ and $CLC_{min}$>allow_$corr_{min\_TH}$) or ($CLC_{max}$<allow_$corr_{max\_TH}$ and $CLC_{min}$<allow $corr_{min\_TH}$), then control proceeds to steps 230 and 234. The max and min allowed correction values (allow_$corr_{max\_TH}$ and allow_$corr_{min\_TH}$) may be calibrated values that may be based upon air meter wear, injector wear, fuel pressure regulator wear and/or injector plugging that are expected for a vehicle.

In step 230, control adjusts the ethanol estimate based on the fuel system error. In step 234, control adjusts the baseline CLC values based on the fuel system error. In step 236, control sets learn correction enable to false. Control returns to step 204. Control also returns to step 204 from steps 204, 210, 218, 222 and 226 when the respective steps are false.

The present disclosure allows a VFFS to accurately estimate ethanol concentration when any ethanol concentration is added. The present disclosure also prevents fuel system wander from sequentially corrupting ethanol estimation.

According to the present disclosure, the VFFS generates ethanol estimates based on apparent change in fuel trim (FT), which corresponds to fuel error. A baseline FT value may be established in order to assess relative changes in FT attributable to changes in ethanol concentration. The present disclosure provides a central tendency, in other words the estimate has a tendency to converge on the true ethanol concentration. The present disclosure mitigates accumulation of error (estimate wander) and allows for actual FT faults to still be detected.

The present disclosure employs a relatively weak feedback loop. The ethanol estimate is adjusted (very slightly) in order to the drive vehicle's FT to its nominal value. This provides a central tendency and counters the accumulation of random error. Feedback introduces a degree of robustness not possible through open-loop control alone. The present disclosure optimize the tradeoff between noise immunity (and tendency to wander) and the ability to detect real FT faults/shifts by providing learned correction with weak authority via a weak feedback loop. The magnitude of adjustment (in adjusting the ethanol estimate) is very small at each refuel event. The magnitude is strong enough to negate the accumulation of error but weak enough to not mask actual FT faults.

What is claimed is:

1. A system for estimating fuel concentration, comprising:
an ethanol estimating module that generates an ethanol estimate based on baseline closed loop corrections (CLC);
a fuel system module that controls fuel to an engine and that generates a fuel system error; and
wherein said ethanol estimating module selectively adjusts said baseline CLC and said ethanol estimate based on said fuel system error.

2. The system of claim 1 further comprising:
a calculating module that generates maximum and minimum CLC values, $CLC_{max}$ and $CLC_{min}$, respectively, based on said baseline CLC,
wherein said ethanol estimating module is enabled when said $CLC_{max}$ and $CLC_{min}$ are less than or equal to and greater than or equal to first and second predetermined values, respectively.

3. The system of claim 1 further comprising:
a refuel event determining module that identifies refueling events,
wherein said ethanol estimating module enables adjustment of said baseline CLC and said ethanol estimate when said refuel events are identified.

4. The system of claim 1 further comprising:
a baseline CLC check module that determines whether a prior baseline CLC is within predetermined criteria,
wherein said ethanol estimating module enables adjustment of said baseline CLC and said ethanol estimate when said prior baseline CLC is within said predetermined criteria.

5. The system of claim 1 wherein said ethanol estimating module enables correction when one of:
said $CLC_{max}$ and $CLC_{min}$ are greater than maximum and minimum allowed correction values, respectively; and
said $CLC_{max}$ and $CLC_{min}$ are less than said maximum and minimum allowed correction values, respectively.

6. The system of claim 5 wherein said maximum and minimum allowed correction values are calibrated values based on at least two of air meter wear, injector wear, fuel pressure regulator wear and injector plugging.

7. The system of claim 1 further comprising:
a refuel event determining module that identifies refueling events; and
a baseline CLC check module that determines whether a prior baseline CLC is within predetermined criteria,
wherein said ethanol estimating module enables adjustment of said baseline CLC and said ethanol estimate when said refuel events are identified and said prior baseline CLC is within said predetermined criteria.

8. A method for estimating fuel concentration, comprising:
generating an ethanol estimate based on baseline closed loop corrections (CLC);
controlling fuel to an engine and generating a fuel system error; and
selectively adjusting said baseline CLC and said ethanol estimate based on said fuel system error.

9. The method of claim 8 further comprising:
generating maximum and minimum CLC values ($CLC_{max}$ and $CLC_{min}$), respectively, based on said baseline CLC; and
enabling an ethanol estimate when said $CLC_{max}$ and $CLC_{min}$ are less than or equal to and greater than or equal to first and second predetermined values, respectively.

10. The method of claim 8 further comprising:
identifying refueling events; and
enabling adjustment of said baseline CLC and said ethanol estimate after said refuel events are identified.

11. The method of claim 8 further comprising:
determining whether a prior baseline CLC is within predetermined criteria; and
enabling adjustment of said baseline CLC and said ethanol estimate when said prior baseline CLC is within said predetermined criteria.

12. The method of claim 8 further comprising enabling correction when one of:
   said $CLC_{max}$ and $CLC_{min}$ are greater than maximum and minimum allowed correction values, respectively; and
   said $CLC_{max}$ and $CLC_{min}$ are less than said maximum and minimum allowed correction values, respectively.

13. The method of claim 12 wherein said maximum and minimum allowed correction values are calibrated values based on at least two of air meter wear, injector wear, fuel pressure regulator wear and injector plugging.

14. The method of claim 9 further comprising:
   identifying refueling events;
   determining whether a prior baseline CLC is within predetermined criteria; and
   enabling adjustment of said baseline CLC and said ethanol estimate after said refuel events are identified and said prior baseline CLC is within said predetermined criteria.

* * * * *